United States Patent [19]

Levin et al.

[11] Patent Number: 5,476,278
[45] Date of Patent: Dec. 19, 1995

[54] SEAT STAYS FOR A BICYCLE FRAME

[75] Inventors: Stephen C. Levin, Boulder; Glen P. Adams, Louisville; Mark N. Pippin, Boulder, all of Colo.

[73] Assignee: Schwinn Cycling & Fitness Inc., Boulder, Colo.

[21] Appl. No.: 274,816

[22] Filed: Jul. 14, 1994

[51] Int. Cl.$^6$ ................................................. B62K 19/00
[52] U.S. Cl. ........................................ 280/288; 280/281.1
[58] Field of Search ............................. 280/220, 281.1, 280/283, 284, 287, 288

[56] References Cited

U.S. PATENT DOCUMENTS

| | | |
|---|---|---|
| 600,329 | 3/1898 | Burnahm . |
| 640,113 | 12/1899 | Dixon . |
| 1,278,122 | 9/1918 | Duffy . |
| 1,458,506 | 6/1923 | Wesson .................................. 280/284 |
| 4,813,591 | 3/1989 | Mueller et al. ................... 280/288.3 X |
| 4,856,801 | 8/1989 | Hollingsworth ........................ 280/284 |
| 4,995,627 | 2/1991 | Yun .................................. 280/281.1 X |
| 5,129,665 | 7/1992 | Sutter et al. ............................ 280/274 |

FOREIGN PATENT DOCUMENTS 2248589  4/1992  United Kingdom ................... 280/288

*Primary Examiner*—Margaret A. Focarino
*Assistant Examiner*—Victor E. Johnson
*Attorney, Agent, or Firm*—Jones, Day, Reavis & Pogue

[57] ABSTRACT

A seat stay assembly for a bicycle frame includes a pair of stays which converge toward one another along a first length of the assembly proximal to the rear wheel axle support. Along an intermediate length the stays flair outwardly from one another and contour around to join one another at a distal end proximate the seat post. The contouring of the stays forms a pocket within which the rear tire can pass with substantial clearance from the stays. By this configuration, brake bosses mounted to stays at the points where they change direction are more rigidly supported than in conventional straight stay designs.

17 Claims, 1 Drawing Sheet

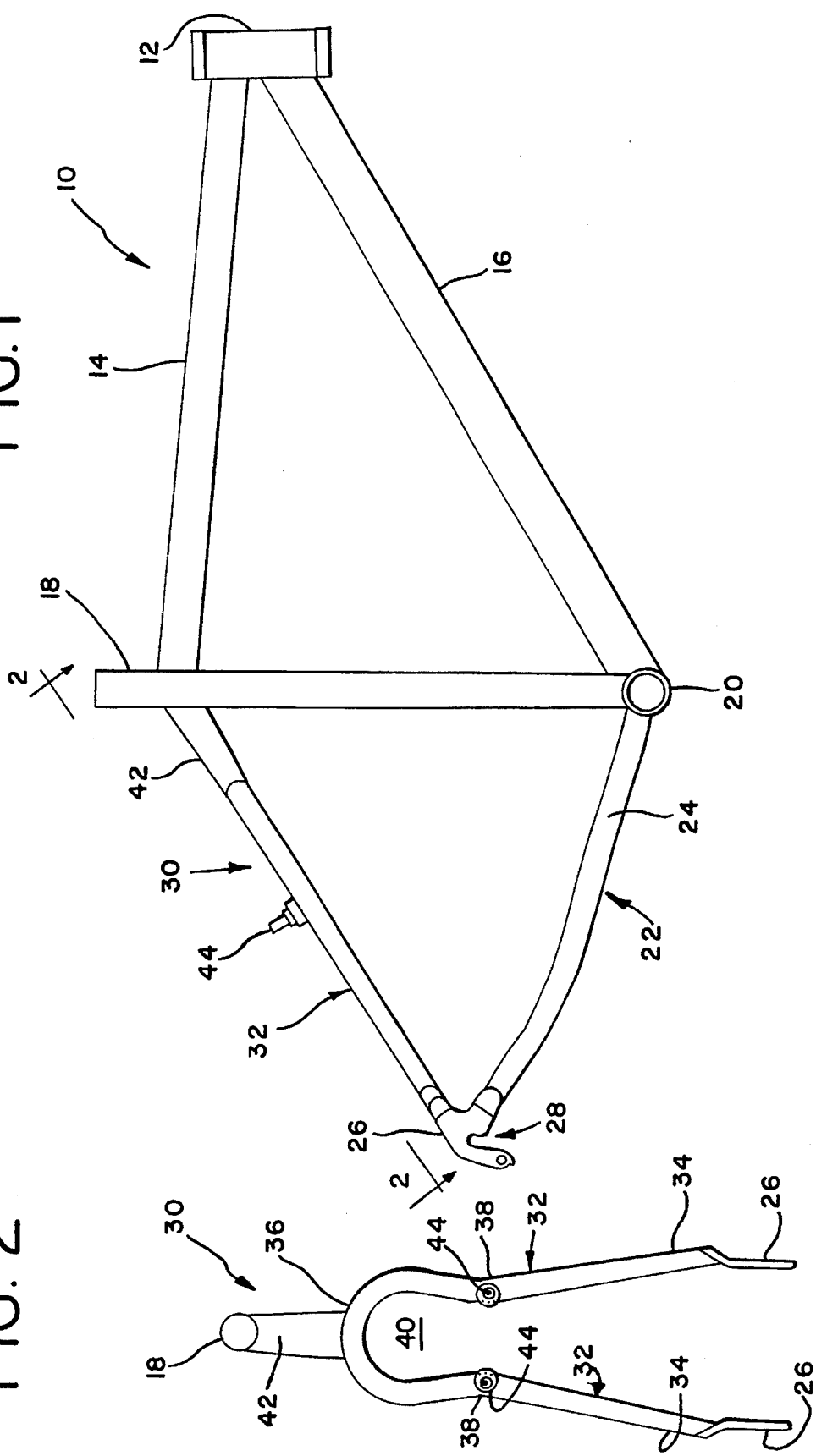

SEAT STAYS FOR A BICYCLE FRAME

BACKGROUND OF THE INVENTION

1. Field of the Invention

The present invention relates generally to structural improvements in bicycle frames, and it relates more particularly to a bicycle frame seat stay assembly providing structural features allowing increased clearance between the rear wheel at down stays in the area of the rear tire; increased brake stiffness, and frame down stay compliance while maintaining lateral stiffness.

2. Description of the Prior Art

Most conventional bicycle frames include a generally vertical seat tube having a pair of generally straight diagonally downwardly extending "seat stays" connected directly or indirectly at their upper ends to the seat tube and terminating at their lower ends in "drop outs" in the area of the rear wheel axle support. The seat stays are essential to give the rear wheel adequate support under the load of the rider as well as additional dynamic loads imposed on the rear wheel during riding conditions.

One popular version of seat stays is a "mono-stay" or "wishbone" which consists of two seat stays which run from the drop outs to above the wheel and then curve in towards each other. One larger tube then links the two seat stays to the back of the seat tube. Seat stays affect many parameters of bike performance, including braking, tire clearance and rear frame stiffness.

Virtually all current mountain bikes have cantilever type brakes which are mounted to bosses on the seat stays in the area where the rear bicycle tire passes between the stays. These brakes comprise two separate brake arms linked by a cable running to a handlebar mounted brake lever. The brakes have pads which engage opposite sides of the tire rim and by mechanical advantage they are designed to apply a considerable force to the rim.

When the brakes are applied, the seat stays of a conventional bicycle frame can be observed to bow outwardly to counteract the braking force. This bowing generally hampers bicycle performance and decreases brake efficiency. Attempts have been made to minimize bowing by having the stays locally thickened or increased in diameter in the area where the brakes are attached. However this adds weight to the frame and increases vertical stiffness of the frame which is not desirable.

Certain stiffness traits are however considered desirable, particularly in a mountain bike. The rear part of the frame should preferably be vertically compliant and laterally stiff. Vertical compliance reduces the shock felt by the rider and improves traction allowing the rear wheel to roll over obstacles rather than bounce over them. Lateral stiffness is desirable from a handling and cornering point of view. Lateral flexing or twisting of the rear wheel impairs cornering and climbing performance of the bicycle. Typically, a large section seat stay will stiffen a frame in both the lateral and vertical directions. Thus frame designers are forced to choose a section which is a compromise.

Mountain bikes are designed for off-road use, which includes travel over rocks, dirt roads, vegetation, mud, etc. It has been widely recognized that maximum tire clearance is beneficial. "Tire clearance" is the gap between the tire and nearest frame member. Maximum tire clearance is desirable for two reasons. First, in recent years there has been a trend to wider tires. Wider tires minimize the available clearance, forcing designers to provide more clearance than was previously necessary. Second, more clearance is desirable for poor weather conditions and mud. Mud or vegetation can build up on a tire and if there is insufficient clearance, this mud or vegetation can contact the frame members which may severely impair the bicycle's performance.

Seat stays are among the most difficult frame members to provide adequate clearance for. Their location, aside the rear wheel, makes them among the tubes most likely to be affected by accumulations of mud or vegetation. Moreover, certain design constraints make it difficult to increase the gap between seat stays. First, the top of the stays must join into the seat tube directly, or into a mono-stay, which then joins the seat tube. This forces the top portions of the tubes to be relatively close to each other, near the location where the tire is at its widest. Second, because of standard brake dimensions, most manufacturers mount the brake studs on the inboard regions of the seat stays to maximize the gap between seat stays. However, even with such an offset, the stays must remain relatively close together at the rim area. In addition, the location of the brake bosses to the inward part of the tube (rather than centered directly over the tube) increases the stresses in this region and results in more brake flex.

SUMMARY OF THE INVENTION

The present invention overcomes the disadvantages of known bicycle frames by providing a frame having seat stays which generally converge toward one another in the direction away from the axle toward the seat tube. In the area of the tire and rim, however, the stays abruptly flare outwardly from one another and contour around the tire to form an open ended generally semi-circular pocket. The stays join one another at the bight of the pocket. Brake bosses for mounting the brakes to the seat stays are provided at the points on the stays where they change direction and on the center of the tube, rather than cantilevered on the inside. By this arrangement, the semi-circular pocket provides significantly greater clearance for the tire so that normal accumulation of mud or vegetation on the tire will not interfere with the stays. Moreover, the curvilinear configuration of the pocket provides increased resistance to bowing of the seat stays during braking, all without adding weight to the frame. Still further, the present pocket configuration permits the frame to be laterally stiff while increasing vertical compliance.

It is a primary object of the invention to provide a seat stay assembly comprising a member extending generally diagonally downwardly from an upper end of a seat post to a wheel support member, the member being bent at an end distal from said wheel support member to form a pair of legs which converge toward one another along a first length of the assembly proximal to the support member and flare outwardly relative to one another along a second portion of the length of the assembly intermediate the first length and distal end of the assembly, thereby to provide increased tire clearance and braking efficiency.

It is a further object of the invention to provide an assembly wherein the brake bosses are mounted to each seat stay at a point where the stay leg changes direction from converging to flaring.

It is yet another object of the invention to provide the pocket in generally semicircular configuration.

BRIEF DESCRIPTION OF THE DRAWINGS

The features and advantages of the invention will be better understood by a reading of the following detailed description taken in connection with the accompanying drawings wherein:

FIG. 1 is a side elevational view of a bicycle frame made in accordance with the invention; and FIG. 2 is a top plan view of a seat stay assembly in accordance with the invention, taken in the direction of the arrows 2—2 in FIG. 1.

DETAILED DESCRIPTION OF THE PREFERRED EMBODIMENTS

Referring now to the drawings, and initially to FIG. 1, a bicycle frame is designated generally by the reference numeral 10. At the forward end of the frame 10 is a head tube 12 which is configured to receive a steering tube and front wheel assembly (not shown). The head tube 12 is connected by tubular members 14 and 16 to a generally vertically extending seat tube 18. The seat tube 18 and tubular member 16 are, in the preferred embodiment, also connected to a cylindrical housing 20. The housing 20, in a conventional manner, serves to house a bearing set which journals the bicycle pedals and front drive sprocket for rotation. Extending rearwardly of the housing 20 is a rear wheel fork 22. The fork 22 comprises a pair of spaced legs 24, only one of which can be seen. The illustrated fork has a slight upward curve in legs 24; straight legs also frequently are used. Each leg 24 is formed to connect to a rear axle support member 26. The support member 26 is provided with suitable "drop outs" 28 so that a wheel axle may be bolted to the frame 10.

In accordance with the invention, a novel seat stay assembly 30 is connected between the axle support members 26 and the seat tube 18. The seat stay assembly 30, as best seen in FIG. 2, includes a pair of allochirally arranged spaced stays 32 fixedly connected at their lower ends 34 to the axle support members 26 and extending generally diagonally between the upper end of the seat tube 18 and the axle support members 26. The stays 32 may be formed from a single tube which is reversely bent to define a distal bight portion 36. Alternatively, each stay 32 can be a separate member joined at the bight portion 36 to the opposite stay 32, as by welding. Another alternative is to form the assembly 30 as a unitary structure using composite materials known in the art.

It is preferred that the stays 32 are generally converging from their lower lengths 34 proximal to the support members 26. Then at a second portion 38 of the assembly length, intermediate the bight portion 36 and the support members 26, the stays 32 flare outwardly of one another. Preferably this change in direction is provided as a radius rather than an abrupt angle, thereby to minimize stress concentration. To form the bight portion 38, the stays 32 curve generally toward one another defining an open ended pocket 40 within which a bicycle tire may freely rotate with adequate clearance from the stays 32. The preferred contour of the pocket 40 is illustrated as generally semi-circular. However, a semi-oval shape is also sufficient to obtain clearance between the tire and the stays 32. A tube segment 42, or "mono-stay," may be used to connect the bight portion 36 to the seat post 18. However, with appropriate dimensioning, the bight portion 38 may be connected directly to the seat tube 18 without a mono-stay 42.

It can now be appreciated that the seat stay assembly 30 of the present invention provides a highly effective structure for rigidly supporting the rear wheel of a bicycle against transverse loads while being vertically compliant to absorb shock from irregular road surfaces.

Moreover, brake stiffness is improved for two reasons. First, the brake bosses are mounted on the center of the tubes 32, giving a more rigid mount, and this is achieved while simultaneously increasing tire clearance. Equally important is that the brake bosses are mounted on the apex of the reverse of the curves, as shown at 38 in FIG. 2. This means the brake force is countered by the inherent stiffness of the inwardly curved portion of the structure's shape.

From FIG. 2, it can readily be seen that tire clearance has been dramatically increased. This has been achieved without having to change the spacing of the brake bosses from their standard spacing locations. This allows a manufacturer of bicycles to use a standard brake assembly in the bicycle construction. In addition, no severe bends or "kinks" are required of the seat stay or the mono-stay to connect with the seat tube.

The rearward view of FIG. 2 also shows the pocket 40 at the top of the assembly. Thus, the "pocket" is substantially more compliant than traditional straight stays. Vertical flex ("ovalizing") of the pocket occurs to reduce the shock fed to the rider and to improve rear wheel traction. With a traditional straight seat stay, the only deformation present is that of the actual compression of the tubes. FIG. 1 shows the "pocket" has negligible effect on frame shape, thereby preserving the "lateral" stiffness of the frame. In examination of FIG. 2, it is observed that the seat stays remain parallel and straight. Therefore, this design significantly increases vertical compliance, while simultaneously minimally affecting lateral stiffness.

The bowed faces provide oppositely directly forces so as to minimize lateral deflection of the frame while preserving the straight and coplanar alignment of the stays when viewed sideways.

In accordance with the invention, brake bosses 44 may be secured to the stays 32 where the stays change direction (at 38) from converging to outwardly flaring. Because of the pocket 40 formed at the distal end 36 of the assembly 30, there is significantly more clearance between the stays 32 and a rotating tire passing therethrough, thereby to prevent excessive accumulation of mud and vegetation from hampering performance of the bicycle. Moreover, as noted, the outward flaring of the stays 32 and their contouring into the bight 36 provides a structure which firmly counteracts the forces imposed on the stays 32 during braking, thereby using the curvature of the stays to significantly reduce bowing of the stays 32 when force is applied, thus increasing braking efficiency.

In a preferred form of a mountain bike, the portion 38 of the stays 32 where the stays 32 change direction have an internal separation distance in a range of between fifty-five and sixty millimeters. Also, ideally in the preferred embodiment, the internal separation distance between the stays 32 within the pocket 40 is on the order of seventy-eight to eighty millimeters. Preferably the stay 32 taper from nineteen millimeters in diameter at the intermediate portion 38 to approximately fifteen millimeters in diameter at their ends 34. Also, the outside radius of curvature of the stays 32 at intermediate portions 38 is on the order of forty millimeters and the radius of curvature inside the pocket 40 is preferably approximately forty-eight millimeters.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A seat stay assembly comprising a seat stay member extending generally diagonally downwardly from an upper end of a seat post to a pair of generally parallel wheel support brackets, said seat stay member comprising a pair of allochirally arranged tube-like legs each having a distal end spaced from said wheel support bracket, said legs being connected at said distal ends forming a bight portion adapted to be secured to the seat post with said legs depending downwardly and rearwardly therefrom and being formed to converge toward one another along a first portion of the length of the assembly proximal to the support brackets and flare outwardly relative to one another along a second portion of the length of the assembly intermediate said first portion and said distal end of said assembly, said legs reconverging along a third portion of the length of the assembly intermediate said second portion and said distal end and joining one another to form an open ended hoop-like pocket within which a bicycle tire can rotate with clearance from said legs, said legs being resiliently compliant at said pocket to absorb loads applied to said wheel support bracket, and wherein brake bosses are mounted to each leg at a point where the legs change direction from converging to flaring.

2. The assembly of claim 1 wherein said legs are tubular members.

3. The assembly of claim 1 wherein said member is formed of a composite.

4. The assembly of claim 1 wherein said legs are formed from a single member.

5. The assembly of claim 1 wherein said legs are individual members joined together at said distal end.

6. The assembly of claim 1 wherein said pocket formed by said legs is generally semicircular.

7. The assembly of claim 1 wherein the brake bosses are substantially centered on each leg with respect to the width of the leg.

8. The assembly of claim 1 wherein the separation distance between the legs at the point along the length of the assembly where the legs change direction from converging to outwardly flaring in a range of between fifty-five to sixty millimeters.

9. The assembly of claim 2 wherein the separation distance between the legs at the maximum inside dimension of the pocket is in a range of between seventy-eight to eighty millimeters.

10. A bicycle frame comprising:

a generally vertical seat post having an upper end and a lower end, said lower end being connected to a drive sprocket housing;

a pair of fork legs extending generally rearwardly from said drive sprocket housing;

a pair of support brackets connected to an end of each of said fork legs distal from said drive sprocket housing;

a seat stay assembly comprising a member extending generally diagonally downwardly from said upper end of said seat post to said support brackets, said member having a distal end spaced from said support brackets and being formed to provide a pair of seat stay legs which converge toward one another along a first portion of the length of the assembly proximal to the support brackets and flare outwardly relative to one another along a second portion of the length of the assembly intermediate said first portion and said distal end of said assembly, said legs reconverging along a third portion of the length of the assembly intermediate said second portion and said distal end and joining one another to form an open ended hoop-like pocket within which a bicycle tire can rotate with clearance from said legs, said legs being resiliently compliant at said pocket to absorb loads applied to said support brackets; and a pair of brake bosses each mounted to one of said legs at a point where said leg changes direction from converging to outwardly flaring.

11. The frame of claim 1, wherein said brake bosses are located on rearwardly facing center surfaces of said seat stay legs.

12. The bicycle frame of claim 7 wherein said support members include means for supporting a axle of a wheel.

13. A bicycle frame comprising:

a generally vertical seat tube having a lower end connected to a drive sprocket housing;

a pair of legs extending generally horizontally from said sprocket housing, each leg having a distal end spaced from said housing;

a pair of support members each connected to a distal end of one of said legs;

a seat stay assembly comprising a pair of tubular members, said tubular members extending generally diagonally downwardly from said seat post to said support members, said tubular members converging toward one another along a first portion of the length of the assembly proximal to the support members and flaring outwardly relative to one another along a second portion of the length of the assembly intermediate said first proximal portion and a distal end of said tubular members and contouring into engagement with one another at said distal end of said tubular members, said contouring of said tubular members defining an open ended hoop-like pocket within which a bicycle tire can rotate, said tubular members being resiliently compliant at said pocket to absorb loads applied to said support members; and a pair of brake bosses each mounted to one said legs at a point where said leg changes direction from converging to outwardly flaring.

14. The bicycle frame of claim 13 wherein said legs extend generally rearwardly of said sprocket housing.

15. The bicycle frame of claim 13 wherein the distal end of said tubular members connects to said seat tube by a single tube segment.

16. The bicycle frame of claim 13 wherein the pocket defined by said tubular member is generally semi-circular.

17. The bicycle frame of claim 13, wherein said brake bosses are located on rearwardly facing center surfaces of said seat stay legs.

* * * * *

UNITED STATES PATENT AND TRADEMARK OFFICE
CERTIFICATE OF CORRECTION

PATENT NO. : 5,476,278
DATED : December 19, 1995
INVENTOR(S) : Stephen C. Levin et al.

It is certified that error appears in the above-indentified patent and that said Letters Patent is hereby corrected as shown below:

Column 1, line 10, change "at" to --and--.

IN THE CLAIMS
Column 5
Claim 9, line 44, change "claim 2" to --claim 1--.

Signed and Sealed this

Eleventh Day of June, 1996

Attest:

BRUCE LEHMAN

Attesting Officer     Commissioner of Patents and Trademarks